United States Patent Office 3,193,526
Patented July 6, 1965

3,193,526
SYNTHETIC POLYMERIC HYDROCARBON COMPOSITIONS STABILIZED WITH AN ARYLMETHYLENE ETHER OF DIALKYLPHENOL COMPOUND
Harold A. Green, Havertown, Pa., assignor to Air Products and Chemicals, Inc., Philadelphia, Pa., a corporation of Delaware
No Drawing. Filed Mar. 19, 1962, Ser. No. 180,859
7 Claims. (Cl. 260—45.95)

The present invention relates to substituted phenol compounds and their use as stabilizing agents in polymeric plastics, particularly in polyolefins.

I have found that compounds of the general formula

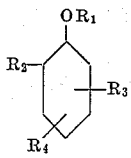

exhibit stabilizing activity for polyolefin fibers and films and/or for other polymeric plastics, in improving resistance of such plastic materials to actinic and thermal degradation or discoloration. In the above formula $R_1$ is H,

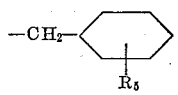

or

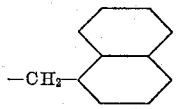

$R_2$ is H, or

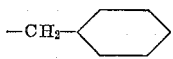

one of the components $R_1$ and $R_2$ containing an arylmethyl radical;
$R_3$ and $R_4$ are acylic hydrocarbon substituents of 4 to 18 carbon atoms; and
$R_5$ is hydrogen or an acyclic hydrocarbon radical of 4 to 18 carbon atoms.

Among the compounds falling within the above formulation which have been found particularly effective for the described purpose, there are included:

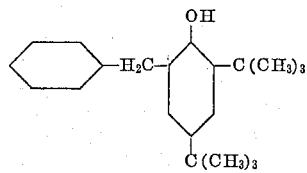

2,4-di-t-butyl-6-benzyl phenol

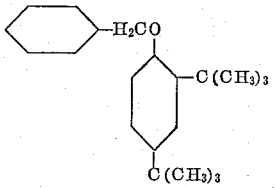

Benzyl ether of 2,4-di-t-butyl phenol

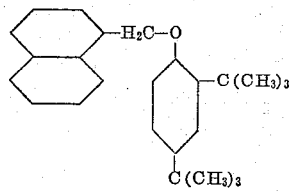

α-Naphthalyl ether of 2,4-di-t-butyl phenol

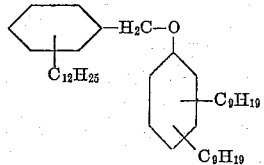

Dodecyl benzyl ether of di-nonyl phenol

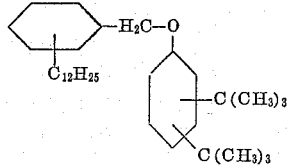

Dodecyl benzyl ether of di-t-butyl phenol

Certain of the above compounds have not previously been prepared or described.

The stabilizers of the invention can be used not only in polyolefin compositions and products, such as polypropylenes and polyethylenes, but also in other plastic compositions subject to degradation by heat and/or light, such as polystyrene and polyvinyl types of resins.

*Example I*

Compounds I and II above, respectively, were incorporated into polymerized polypropylene by conventional high temperature milling at 450°–500° F., utilizing in each test 1% by weight of the stabilizer. The milled compositions were extruded in molten state to form fibers. The fibers were wrapped under tension around a supporting card and exposed in a Fade-O-Meter at 145° F. The time of the exposure until breaking of the fiber was observed and compared in the tabulation below with a control fiber free of stabilizer.

| Stabilizer: | Time to failure, hours |
|---|---|
| None | 20–40 |
| 1% compound I | 200 |
| 1% compound II | 170 |

In addition to the high degree of effectiveness demonstrated for the above compounds, it was also observed that neither of the tested phenolic compounds imparted color to the polymer on exposure. Color formation has been a serious defect of a number of proposed commercial additives.

The benzyl ether compounds (II) can be prepared in accordance with the methods described in U.S. Patents 2,109,457, and 2,109,514. Our preferred method involves reaction of equimolar quantities of the alkali metal phenolate with benzyl chloride in glycol ether type solvent.

*Example II*

The 6-benzyl phenol (I) was prepared by dissolving 206 parts by weight of 2,4-di-t-butyl phenol in chloroform (1 mol per liter of solvent). To the solution there was added 60 parts by weight powdered anhydrous zinc chloride followed by agitation with slow addition of a slight stoichiometric excess of benzyl chloride.

The reaction mixture was refluxed for 40 hours then cooled and washed with water to remove ZnCl₂. The organic layer was dried over magnesium sulfate, stripped of chloroform, and fractionally distilled to obtain the 2,4-di-t-butyl-6-benzyl phenol. The product was recovered as a solid of off-white color; boiling at 193° C. at 10 mm. Hg abs. and melting at 54° C. The infra red spectrum showed strong phenolic absorption at 2.95 m$\mu$.

|  | Calculated for $C_{21}H_{28}O$ | Found |
|---|---|---|
| Percent C | 85 | 84.8 |
| Percent H | 9.5 | 9.7 |

Example III

Benzyl ether of 2,4-di-t-butyl phenol (II) was prepared by reacting at 50° C. substantially equimolar quantities of potassium salt of 2,4-di-t-butyl phenol with benzyl chloride in dimethyl ether of ethylene glycol (½ liter per gram mol of phenolate). After stirring for 24 hours, the solution was filtered to remove KCl and stripped of solvent. The product was isolated by crystallization from ethanol-water, obtaining white needles, M.P. 88° C.

Example IV

By the same method described in Example III, above, compound III was prepared by reaction of 2,4-di-t-butyl phenol with 1-chloromethylnaphthalene. The obtained alpha naphthalyl ether of 2,4-di-t-butyl phenol is a white solid melting at 95–97° C., the infra-red spectrum showing strong absorption at 8.1 m$\mu$ (ether) and being devoid of absorption at 2.95 m$\mu$ (phenolic hydroxyl).

|  | Calculated for $C_{25}H_{30}O$ | Found |
|---|---|---|
| Percent C | 86.7 | 86.2 |
| Percent H | 8.7 | 8.2 |

This compound as well as the corresponding benzyl ether (II) were found to exhibit stabilizing activity for impact polystyrenes.

Example V

Compound IV was similarly prepared. The sodium salt of di-nonyl phenol was dissolved in dimethylether of ethylene glycol to provide a solution containing approximately 1 mol of salt per liter of solvent. The solution was heated to reflux and a slight molar excess (1.1/1.0) of dodecyl benzyl chloride added. The dodecyl ether of di-nonyl phenol was obtained as an off-white viscous liquid.

|  | Calculated for $C_{43}H_{72}O$ | Found |
|---|---|---|
| Percent C | 85.5 | 84.2 |
| Percent H | 11.8 | 10.8 |

The compound is active as a stabilizing agent for polypropylene.

Example VI

To prepare the dodecyl benzyl ether of 2,4-di-t-butyl phenol (V), 114 parts by weight of the sodium salt of 2,4-di-t-butyl phenol were dissolved in ethylene glycol dimethyl ether to provide a solution having 228 parts phenolate per liter of solvent. To the obtained solution there was added 146 parts by weight of dodecyl benzyl chloride and the mixture stirred at 35° C. for 48 hours.

The solvent was distilled off until pot temperature rose to 100° C., and the residue refluxed with methanolic sodium hydroxide (Claisen's alkali), with addition of benzene to facilitate separation of the layers. The product layer was washed with water until free of chloride, and then treated with charcoal adsorbent, filtered and heated to 150° C. under vacuum (4 mm. Hg). A viscous yellow oil was obtained. The infra-red spectrum showed no band corresponding to phenolic hydroxyl and strong absorption at 8.10 m$\mu$ (ether band).

|  | Calculated for $C_{33}H_{52}O$ | Found |
|---|---|---|
| Percent C | 85.3 |  |
| Percent H | 11.2 |  |

Example VII

Polypropylene was milled respectively with 1% and 2% of dodecyl benzyl ether of di-nonyl phenol (IV) and extruded to mono-filaments. Another batch of polypropylene was milled with compound (V). These were exposed under tension to Fade-O-Meter test with the results shown below and compared with other phenolic stabilizers.

| Stabilizer | Percent Weight in fiber | Denier | Fade-O-Meter, Hours | Percent Retained Tenacity |
|---|---|---|---|---|
| Compound IV | 1.0 | 162 | 60 | 62.5 |
|  |  |  | 100 | Broken |
| Compound IV | 2.0 | 156 | 60 | 56.8 |
|  |  |  | 100 | --------- |
|  |  |  | 120 | Broken |
| Compound V | 1.0 | 120 | 40 | 64.7 |
|  |  |  | 80 | 45 |
|  |  |  | 100 | Broken |
| Benzyl ether of p-t-butyl phenol | 1.0 | -------- | 60 | Broken |

Example VIII

1% each of compounds I and III, respectively, were incorporated into a commercial sample of impact polystyrene (Dow 475–B) by preheating for three minutes and milling at 275° F. The milled stocks were molded into 1/16" slabs under the following conditions in an eight minute cycle:

5½ min., contact pressure _____ 375° F.
1½ min., 30,000 p.s.i. _____ 375° F.
1 min., 35,000 p.s.i. _____ Cold press.

The samples were tested under standard conditions (ASTM–D638) and found to show a marked retardation of embrittlement of milled and molded product, as follows:

| Stabilizer Compound | I | III | None |
|---|---|---|---|
| Unmilled, unmolded: |  |  |  |
| Yield strength, p.s.i. |  |  | 3,060 |
| Breaking strength, p.s.i. |  |  | 2,410 |
| Ultimate elongation, percent |  |  | 42 |
| Milled and molded: |  |  |  |
| Yield strength, p.s.i. | 3,960 | 3,855 | 3,940 |
| Breaking strength, p.s.i. | 2,735 | 2,750 | 2,890 |
| Ultimate elongation, percent | 18 | 34 | 7 |

Compound II gave results similar to compound I above.

In general the phenolic stabilizing agents should be employed in quantities of from about 0.1% to 2.0% by weight of the resin polymer. For example, about 0.5% of compounds I or III would be suitable for stabilization of low density polyethylene, while for polyvinyl chloride as little as 0.1% may be used. Auxiliary stabilizers may be included to provide extended oven life in the presence of atmospheric oxygen.

Obviously many modifications and variations of the invention as hereinbefore set forth may be made without departing from the spirit and scope thereof, and therefore only such limitations should be imposed as are indicated in the appended claims.

What is claimed is:
1. The method of stabilizing synthetic polymeric hydocarbon materials to improve their resistance to actinic and thermal degradation which comprises the incorpora- tion therein of from 0.1% to about 2% by weight of a stabilizer which is an arylmethylene ether of dialkylphenol in which each alkyl gorup contains from 4 to 18 carbon atoms.

2. The method of stabilizing synthetic polymeric hydrocarbon materials to improve their resistance to actinic and thermal degradation which comprises the incorporation therein by milling at a temperature of from about 450° F. to about 500° F. from 0.1% to about 2% by weight of dodecyl benzyl ether of di-nonyl phenol.

3. Stabilized polymeric hydrocarbon plastic composition containing from 0.1% to about 2% by weight of dodecyl benzyl ether of di-nonyl phenol.

4. Stabilized polymeric hydrocarbon plastic composition containing from 0.1% to about 2% by weight of alpha naphthalyl ether of 2,4-di-t-butyl phenol as stabilizing agent.

5. Stabilized polymeric hydrocarbon plastic composition containing from 0.1% to about 2% by weight of benzyl ether of 2,4-di-t-butyl phenol as stabilizing agent.

6. Impact polystyrene stabilized with from 0.1% to about 2% by weight of benzyl ether of 2,4-di-t-butyl phenol.

7. Impact polystyrene stabilized with from 0.1% to about 2% by weight of alpha-naphthalyl ether of 2,4-di-t-butyl phenol.

References Cited by the Examiner
UNITED STATES PATENTS

| | | | |
|---|---|---|---|
| 2,181,119 | 11/39 | Caplan | 260—612 |
| 2,213,218 | 9/40 | Hester | 260—612 |
| 2,276,117 | 3/42 | Taylor et al. | 260—619 |
| 2,789,108 | 4/57 | Mills et al. | 260—45.95 |
| 2,909,504 | 10/59 | Spacht | 260—45.95 |
| 3,047,503 | 7/62 | Jaffe et al. | 260—45.95 |
| 3,134,751 | 5/64 | Costello | 260—45.95 |
| 3,134,752 | 5/64 | Costello et al. | 260—45.95 |

JOSEPH L. SCHOFE, *Primary Examiner.*

J. R. LIBERMAN, DONALD E. CZAJA, *Examiners.*

UNITED STATES PATENT OFFICE
CERTIFICATE OF CORRECTION

Patent No. 3,193,526                                  July 6, 1965

Harold A. Green

It is hereby certified that error appears in the above numbered patent requiring correction and that the said Letters Patent should read as corrected below.

Column 1, line 45, for "acylic" read -- acyclic --; column 4, in the first table, under the column heading "Found" insert the following:

84.5
                         10.4 column 5, line 3, for "gorup" read -- group --.

Signed and sealed this 15th day of February 1966.

(SEAL)
Attest:

ERNEST W. SWIDER                                        EDWARD J. BRENNER
Attesting Officer                                                 Commissioner of Patents